United States Patent [19]

Bush

[11] 3,936,833
[45] Feb. 3, 1976

[54] GARAGE DOOR RADIO CONTROL TRANSMITTER ASSEMBLY

[75] Inventor: Walter R. Bush, West Simsbury, Conn.

[73] Assignee: The Stanley Works, New Britain, Conn.

[22] Filed: June 12, 1974

[21] Appl. No.: 478,640

[52] U.S. Cl................................ 343/225; 325/119
[51] Int. Cl.² .......................................... H04B 1/03
[58] Field of Search................ 340/171 R; 343/225; 174/17 CT; 339/176 R; 325/111, 114, 117, 119, 105, 182, 492; 49/25

[56] References Cited
UNITED STATES PATENTS

| | | | |
|---|---|---|---|
| 3,090,959 | 5/1963 | Marmont | 325/117 X |
| 3,364,427 | 1/1968 | Bennett | 325/105 |

FOREIGN PATENTS OR APPLICATIONS

| | | | |
|---|---|---|---|
| 1,108,755 | 6/1961 | Germany | 325/117 |

*Primary Examiner*—Donald J. Yusko

[57] ABSTRACT

An assembly is provided which is particularly suited for use as a mounting means for supporting a garage door radio control transmitter within a motor vehicle. The assembly consists of the garage door radio control transmitter and a housing therefor provided in the dashboard of the vehicle. The assembly is designed to be operable to permit the transmitter to be used either when supported in the aforesaid housing or when removed therefrom. The transmitter comprises an enclosure within which suitable electrical circuitry embodying conventional construction is housed operable to produce a signal which in turn is effective to actuate control mechanism for causing a garage door to open and close. The enclosure which is substantially rectangular in configuration is provided with a pair of end walls, one of which has mounted thereon terminal means operable for connecting the transmitter in electrical circuit relation with a suitable externally located electrical power supply. The other of the pair of end walls has embodied thereon switch means operable for selectively providing the transmitter with an ON or an OFF operating state. In addition, on one of the side walls of the enclosure there is provided contact means operable for connecting the transmitter in electrical circuit relation with antenna means when the transmitter is positioned in the aforesaid housing thereby to improve the characteristics of the signal transmitted from the transmitter. A disconnect switch is also provided on one of the side walls of the enclosure operable for automatically disconnecting the internal power supply of the transmitter when the latter is inserted into the housing and thereby connected in electrical circuit relation with an external power supply. The housing formed in the dashboard of the vehicle is defined by a top and a bottom wall, a pair of suitably spaced side walls, an open end wall and a closed end wall. Terminal means are suitably mounted on the closed end wall of the housing so as to be capable of being cooperatively associated with the terminal means of the transmitter when the latter is received in the housing through the open end wall thereof. Moreover, camming means are supported on one of the side walls of the housing so as to be suitably located thereon thereby to be effective when the transmitter is being inserted into the housing to actuate the disconnect switch of the transmitter. Also, one of the side walls of the housing is provided with antenna contact means engageable with the contact means of the transmitter so as to be effective to complete an electrical circuit therethrough between an antenna with which the vehicle is provided and the signal producing electrical circuitry of the transmitter.

10 Claims, 6 Drawing Figures

GARAGE DOOR RADIO CONTROL TRANSMITTER ASSEMBLY

BACKGROUND OF THE INVENTION

There have been devices provided heretofore which are operable as transmitters to provide signals effective to control the operation of a movable member such as, for example, a garage door or similar structure. In accord with the mode of operation of such devices, the member to be controlled is provided with some form of receiver operatively connected to the member so as to be operable to receive signals produced by the transmitter and to initiate some form of control function affecting the operation of the member in response to receipt by the receiver of signals from the transmitter.

Although the prior art forms of such transmitters have all been characterized by the fact that they are capable of performing the same function in essentially the same manner, they have nevertheless generally differed one from another insofar as concerns the nature of their construction. Notwithstanding the fact that there have been available a variety of models of such transmitters embodying different styles and shapes in sufficient numbers to match the taste of substantially any potential purchaser thereof, such transmitters have not as of yet reached the level of sales which had been anticipated therefor. Undoubtedly, there exist many reasons why such transmitters have not met with greater commercial success not the least of which is the fact that in the minds of at least some potential purchasers thereof, they have been looked upon as being in the nature of a luxury item rather than as a necessary item.

Something has taken place in recent months, however, which has had the effect of altering the latter characterization of garage door radio control transmitters. The event to which reference is had in this connection is the enactment of the new, i.e., 1974, safety regulations imposed by the Federal Government on manufacturers of motor vehicles. More specifically, reference is had to the requirement that each 1974 model of motor vehicle embody means whereby the engine of the motor vehicle is not capable of being started until the seat belts of the occupants of the motor vehicle have been fastened. Thus, whereas heretofore it had been a relatively simple task for one to remove a motor vehicle from a garage and close the garage door thereafter, the aforereferenced safety requirement has had the effect of rendering this a time-consuming task. For example, the individual heretofore need merely open the garage door, enter the motor vehicle, start the latter, remove it from the garage, and then generally while leaving the vehicle running return to the garage and close the door thereof. However, this procedure can no longer be followed in the case of 1974 motor vehicles.

With 1974 motor vehicles, although some of the initial steps in the aforedescribed procedure remain the same, once the motor vehicle has been removed from the garage a more time-consuming procedure must be followed before the driver of the vehicle is capable of closing the garage door and proceeding on his way in the vehicle. More specifically, the following procedure must be followed in the case of 1974 motor vehicles. First, the driver proceeds to the garage, opens the garage door, and enters the motor vehicle. Once in the vehicle, the driver must buckle his seat belt before he is capable of starting the engine of the vehicle to remove the latter from the garage. After the latter step has been accomplished, the driver must unbuckle his seat belt, leave the vehicle, proceed to the garage, close the door thereof, and then upon returning to the vehicle he must once again buckle his seat belt before he can restart the engine of the motor vehicle preparatory to driving away in the vehicle. This procedure obviously is considered by many to be extremely exasperating.

The procedure described in the preceding paragraph, however, is capable of being obviated through the use of a garage door radio control transmitter. By utilizing such a device, the driver need not leave the motor vehicle to close the garage door thereby eliminating the need to perform the steps of unbuckling his seat belt, leaving the vehicle, walking to the garage, closing the door thereof, returning to the vehicle, rebuckling his seat belt, restarting the engine of the vehicle, to finally arrive at the point where he is capable of leaving the premises in the vehicle. It should be readily apparent from the above-description why in the minds of many potential purchasers thereof that garage door radio control transmitters are now considered to have achieved the status of being classified as a necessary item rather than as an item of luxury.

With the advent of the aforedescribed safety requirements, it is anticipated that not only will there be a greater number of individuals utilizing garage door radio control transmitters, but also that increased usage will be made of the transmitters. Consequently, a desired characteristic of such a garage door radio control transmitter is that it have a long operating life. Heretofore, the garage door radio control transmitters which have been provided have most commonly embodied a construction wherein they depended on batteries for their power supply. Obviously, one means of extending the operating life of the batteries is to periodically recharge the batteries. To accomplish the recharging of the batteries, it would be most desirable to provide the transmitter with means operable to enable the batteries to be recharged while housed in the transmitter and preferably during periods of nonuse whereby the transmitter is always ready for instant use.

One undesirable feature which has evidenced itself in connection with the use heretofore of garage door radio control transmitters is that very little has been done insofar as concerns associating with the transmitter some form of means operable for stowing the transmitter in a secure and efficient manner during periods of nonuse. More specifically, the practice which commonly has been followed is to place the transmitter when not in use either on the dashboard or the seat of the motor vehicle. The result of following this practice is to increase the likelihood that the transmitter may fall off the dashboard or from the seat and be damaged, or that the transmitter may be lost or misplaced and thereby not be readily locatable when required. Therefore, it is desirable to provide some type of stowage means effective to minimize the possibility of the transmitter being accidentally damaged when not in use and which would also function to render the transmitter readily available when its use is desired.

Thus, although the prior art evidences the fact that it has been known heretofore to provide devices operable as garage door radio control transmitters, it can also be seen with reference to the above that there still exists a need to make improvements in the nature of the construction as well as providing means associable with the transmitter operable for minimizing the likelihood that accidental damage may be suffered thereby. There has thus existed a need to provide a garage door radio control transmitter assembly which would overcome the disadvantages possessed by prior art devices to which reference has been had hereinabove, as well as an assembly embodying other advantages relating to the construction and method of employment thereof.

Accordingly, it is an object of the present invention to provide a novel and improved garage door radio control transmitter assembly which is particularly suited for use as a mounting, i.e., stowing, means for supporting a garage door radio control transmitter within a motor vehicle.

It is another object of the present invention to provide such a garage door radio control transmitter assembly consisting of a garage door radio control transmitter and a housing therefor provided in the dashboard of the vehicle.

A further object of the present invention is to provide such a garage door radio control transmitter assembly wherein the transmitter is operable either when positioned in the housing or when removed therefrom.

A still further object of the present invention is to provide such a garage door radio control transmitter assembly wherein the batteries of the transmitter are rechargeable when the latter is positioned in the housing provided therefor in the dashboard of the vehicle.

Yet another object of the present invention is to provide such as garage door radio control transmitter assembly wherein the transmitter thereof is compatible with the receivers which are presently being employed for the purposes of accomplishing radio control operation of garage doors.

Yet still another object of the present invention is to provide such a garage door radio control transmitter assembly which is relatively inexpensive to manufacture, is easy to employ, and is capable of providing long and trouble-free operation.

SUMMARY OF THE INVENTION

It has now been found that the foregoing anad related objects can be readily attained in an assembly which is particularly suited for use as a mounting means for supporting a garage door radio control transmitter within a motor vehicle. The assembly consists of the garage door radio control transmitter and a housing therefor provided in the dashboard of the motor vehicle. The assembly is designed to be operable to permit the transmitter to be used either when supported in the aforesaid housing or when removed therefrom. The transmitter comprises an enclosure within which suitable electrical circuitry embodying conventional construction is housed operable to produce a signal which in turn is effective to actuate control mechanism for causing a garage door to open and close. The enclosure which is substantially rectangular in configuration is provided with a pair of end walls, one of which has mounted thereon terminal means operable for connecting the transmitter in electrical circuit relation with a suitable externally located electrical power supply. The other of the pair of end walls has embodied thereon suitable switch means operable for selectively providing the transmitter with an ON or an OFF operating state. The housing formed in the dashboard of the vehicle is defined by a top and a bottom wall, a pair of suitably spaced sidewalls, an open end wall and a closed end wall. Terminal means are suitably mounted on the closed end wall of the housing so as to be capable of being cooperatively associated with the terminal means of the transmitter when the latter is received in the housing through the open end wall thereof.

In accord with the preferred embodiment of the invention, the terminal means with which the transmitter is provided comprises a pair of suitably spaced receptacles into which the terminal means of the housing is capable of being received in electrical contact relationship therewith. The terminal means of the housing in turn comprises a pair of male plugs suitably connected in electrical circuit relation with the electrical system of the motor vehicle. The transmitter is also provided on one of the sidewalls thereof with contact means operable for connecting the transmitter in electrical circuit relation with antenna means when the transmitter is positioned in the aforesaid housing thereby to improve the characteristics of the signal transmitted from the transmitter. A disconnect switch is also provided on one of the sidewalls of the enclosure operable for automatically disconnecting the internal power supply of the transmitter when the latter is inserted into the housing and thereby connected in electrical circuit relation with an external power supply. One of the sidewalls of the housing formed in the dashboard of the motor vehicle has supported thereon camming means. The latter camming means are suitably located on the housing sidewall so as to be effective when the transmitter is being inserted into the housing to actuate the disconnect switch of the transmitter. Also, one of the sidewalls of the housing is provided with antenna contact means engageable with the contact means of the transmitter so as to be effective to complete an electrical circuit therethrough between an antenna with which the vehicle is provided and the signal producing electrical circuitry of the transmitter.

DETAILED DESCRIPTION OF THE ILLUSTRATED EMBODIMENT

Figure 1:
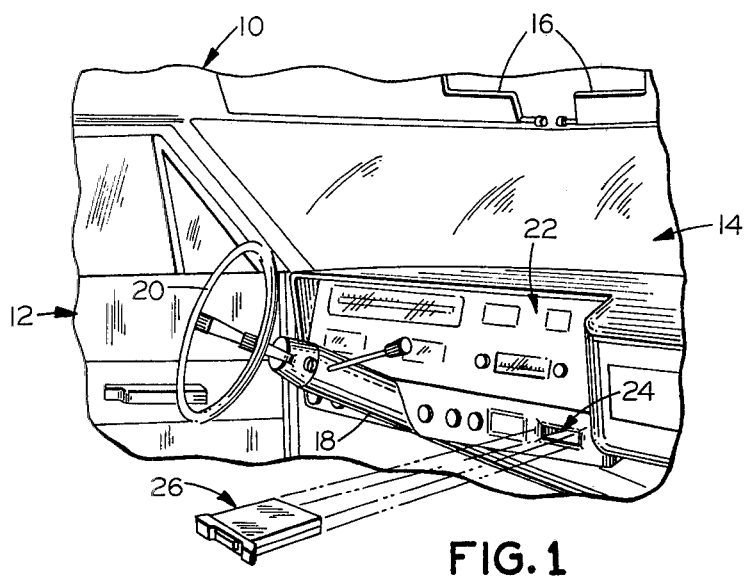
FIG. 1 is a perspective view of a portion of the interior of a motor vehicle embodying a garage door radio control transmitter assembly constructed in accordance with the present invention.

Referring now to the drawings, and more particularly FIG. 1 thereof, there is depicted therein a portion of the interior, generally designated by reference numeral 10, of a motor vehicle. In accord with well-known practice, the motor vehicle of FIG. 1 is provided with a door, generally designated by reference numeral 12, which is operable to permit ingress into and egress out of the interior 10 of the motor vehicle. In addition, the motor vehicle is provided with a windshield 14 affording visibility into and out of the interior 10 of the motor vehicle. Suitably spaced within the interior 10 of the vehicle, there is provided a steering mechanism 18 which is operatively connected at one end to the front wheels (not shown) of the vehicle and which has a steering wheel 20 affixed to the other end thereof whereby in well-known fashion the motor vehicle may be caused to follow a desired course of travel by operating the steering wheel 20 so as to transmit control signals therefrom through the steering mechanism 18 to the wheels of the motor vehicle causing the front wheels of the motor vehicle to be turned in the direction in which it is desired that the motor vehicle proceed.

Continuing with the description of the portion of the interior 10 of the motor vehicle depicted in FIG. 1 of the drawings, the vehicle as shown therein is provided with a dashboard, generally designated by reference numeral 22, which in accord with conventional practice functions as a support or mounting means for the various gauges and other instrumentation which are commonly employed in a motor vehicle to visually depict to the driver thereof the operating state of various ones of the operating components of the vehicle as well as a support for other functional components such as the radio, clock, ashtray, cigarette lighter, glove compartment, etc. Above the dashboard 22 in spaced relation thereto there is preferably provided a pair of sun visors 16 operable for movement between a first position wherein they are effective to partially obscure the sun from the eyes of the driver, and a second position wherein they are disposed in a rest position. The dashboard 22 as shown in FIG. 1 also embodies a garage door radio control transmitter assembly consisting of a housing, generally designated by reference numeral 24, formed in the dashboard 22 and a transmitter, generally designated by reference numeral 26, receivable in the housing 24 in a manner which will be more fully described subsequently. Inasmuch as the nature of the construction of the interior 10 of the motor vehicle is well-known to those skilled in the art, and is only indirectly related to the subject matter of the present invention, it is not deemed necessary for purposes of obtaining a understanding of the present invention to describe the interior 10 of the motor vehicle with more particularity than that which has already been set forth hereinabove.

Figure 2:
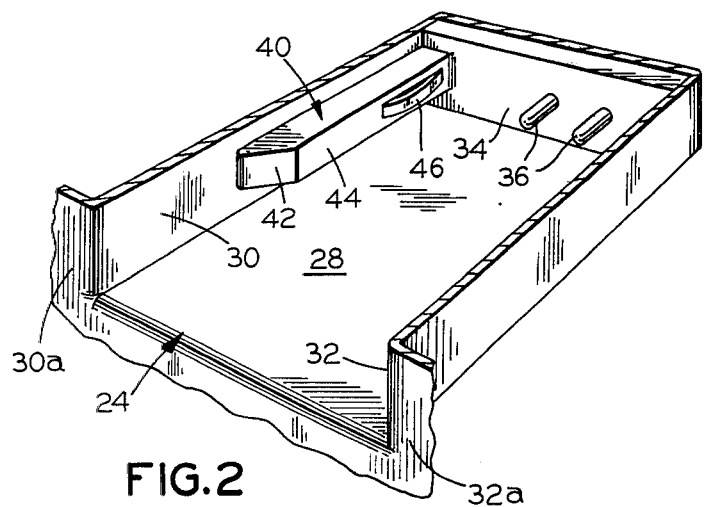
FIG. 2 is a perspective view of a portion of the housing of a garage door radio control transmitter assembly constructed in accordance with the present invention.
Figure 4:
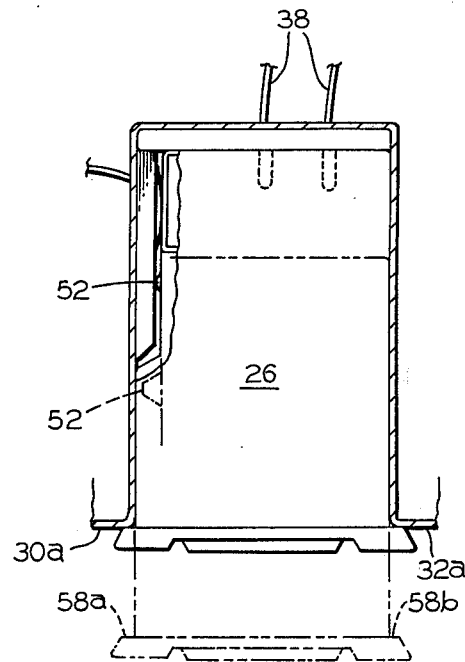
FIG. 4 is a top plan view with a portion thereof broken away of a garage door radio control transmitter assembly constructed in accordance with the present invention, with the transmitter illustrated in solid lines fully inserted into the housing and in broken lines partially inserted into the housing.

Referring now to FIG. 2 of the drawings, a description will now be set forth of the nature of the construction of the housing 24 illustrated therein. The housing 24 is in the nature of a suitably dimensioned recess which is provided in the dashboard 22 so as to be readily accessible to the driver of the motor vehicle when seated behind the steering wheel 20 of the vehicle. The housing 24 in accord with the illustrated embodiment thereof embodies a generally rectangular configuration. More specifically, the housing 24 is defined by a top wall (not shown), a bottom wall 28, a pair of suitably spaced sidewalls 30 and 32, a closed end wall 34, and an open front wall. It is, of course, to be understood that the depth of the housing 24 defined as the distance measured between the open front wall of the housing 24 and the closed end wall 34 thereof, the width of the housing 24 defined as the distance measured between the sidewalls 30 and 32, and the height of the housing 24 defined as the distance measured as the distance between the top wall (not shown) and the bottom wall 28 of the housing 24 are all suitably selected so as to conform to the external dimensions of the transmitter 26. With reference further to the nature of the construction of the housing 24, the latter has a pair of male plugs 36 suitably mounted on the rear end wall 34 thereof in suitably spaced relation relative to each other. The male plugs 36 which are operable as a terminal means are suitably located on the end wall 34 so as to be engageable with cooperable terminal means carried by the transmitter 26 when the latter is inserted into the housing 24, as will be described more fully hereinafter. The male plugs 36 may be secured in position on the end wall 34 so as to project outwardly therefrom into the interior of the housing 24 through the use of any suitable conventional form of fastening means. Insofar as concerns the nature of the construction of the male plugs 36, the latter each preferably embodies structure of a conventional nature which is well-known to those skilled in the art and which is commonly found employed in a variety of different types of electrical devices wherein it is desired to establish electrical contact between a pair of elements to create an electrical circuit therebetween. As shown in FIG. 4 of the drawings, each of the male plugs 36 has connected thereto one end of a length of electrical wire 38 which in turn is connected to the electrical system of the motor vehicle. The wires 38 thus operatively connect the male plugs 36 in electrical circuit relation with the electrical power supply of the vehicle.

Continuing with the description of the housing 24, one of the sidewalls thereof, i.e., sidewall 30, as best understood with reference to FIG. 2 of the drawings has supported thereon a camming means, generally designated by reference numeral 40. The camming means 40 consists of an elongated generally rectangular member 44 suitably secured in fixed relation on the inner surface of the sidewall 30 so as to be positioned thereon whereby one end of the member 44 abuts against the end wall 34 and the other end, i.e., the end 42, of the member is spaced inwardly of the open front of the housing 24. The end 42 of the member 44 is preferably inclined whereby to provide a camming surface located in the path of movement of a portion of the transmitter 26 when the latter is inserted into the housing 24 for a purpose to which further reference will be had subsequently. The member 44 also functions as a support for a contact strip 46, the latter being formed from a suitable metallic material capable of functioning as a conductor. As depicted in FIG. 2 of the drawings, the contact strip 46 is mounted, through the use of any conventionally known mounting means, on the member 44 so as to be positioned intermediate the ends of the latter and so as to project into the interior of the housing 24 for a purpose yet to be described. As best understood with reference to FIG. 4 of the drawings, the contact strip 46 is suitably connected to one end of an electrical conductor, i.e., wire 47 which in turn is connected in electrical circuit relation with an antenna means (not shown) with which the motor vehicle embodying the interior 10 is provided.

Figure 3:
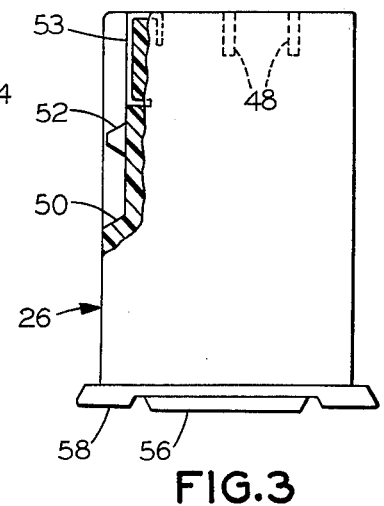
FIG. 3 is a top plan view partially in section of the transmitter of a garage door radio control transmitter assembly constructed in accordance with the present invention.
Figure 5:
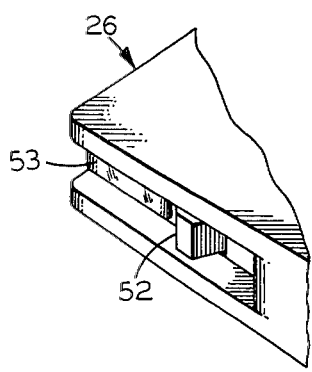
FIG. 5 is a perspective view of a portion of the transmitter of a garage door radio control transmitter assembly constructed in accordance with the present invention, illustrating the disconnect switch means thereof.
Figure 6:
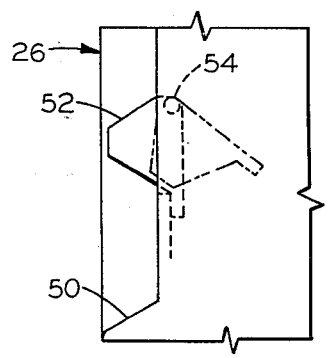
FIG. 6 is a top plan view of a portion of the transmitter of a garage door radio control transmitter assembly constructed in accordance with the present invention, illustrating in solid lines the disconnect switch means thereof in its inoperative position and in broken lines the disconnect switch means in its operative position.

Referring next particularly to FIGS. 3, 5 and 6 of the drawings, a description will be set forth of the nature of the construction of the transmitter 26. Insofar as concerns the internal components housed within the transmitter 26, the latter is similar to the garage door radio control transmitters presently being commercially marketed by several manufacturers. More specifically, the transmitter 26 embodies the same electrical circuitry (not shown) which is utilized in the aforereferenced known transmitters being marketed for purposes of producing a signal capable of being transmitted to a suitable receiver operatively connected to a movable member to cause some form of control function affecting the movement of the member to be initiated, upon receipt by the receiver of signals from the transmitter. Inasmuch as the aforereferenced electrical circuitry is of conventional construction well-known to those skilled in the art and is only indirectly related to the subject matter of the present invention, it has not been deemed necessary to describe in detail herein or to illustrate in the drawings this electrical circuitry for one to obtain an understanding of the present invention.

Continuing with a description of the transmitter 26, the latter in accord with the illustrated embodiment thereof is generally rectangular in configuration. Moreover, the external dimensions of the transmitter 26 are selected to be such that they are slightly less than the internal dimensions of the housing 24 whereby the transmitter 26 is insertable into the latter with a sliding fit. The rear wall of the transmitter 26 is provided with a pair of suitably dimensioned receptacles 48 which are operable as a terminal means for the transmitter 26. Insofar as concerns the specific nature of the construction of the receptacles 48, the latter are each preferably constructed in accordance with conventional practice which is well-known to those skilled in the art. Such receptacles 48 are commonly found employed in a variety of different types of electrical devices wherein it is desired to establish electrical contact between a pair of elements to create an electrical circuit therebetween. The internal diameter of each of the receptacles 48 is suitably selected so as to conform to the external diameter of the male plugs 36 whereby the latter are receivable in the receptacles 48 with a sufficiently tight fit to ensure the establishment of good electrical contact between the external surface of each of the male plugs 36 and the internal surface of a corresponding one of the receptacles 48. Further reference will be had hereinafter to the male plugs 36 and the receptacles 48 in conjunction with a description of the mode of operation of the garage door radio control transmitter assembly constructed in accord with the present invention.

As best understood with reference to FIGS. 3 and 5 of the drawings, one of the sidewalls of the transmitter 26 is preferably provided with a suitably dimensioned slot 50. Insofar as concerns the dimensions of the slot 50, the configuration of the latter slot 50 is selected so as to permit the member 44 to be slid therewithin. Consequently, the height of the slot 50 conforms to the thickness of the member 44 with the former being slightly greater than the latter, and the depth of the slot 50 is selected to be slightly greater than the width of the member 44. Within the slot 50 there is located a disconnect switch means 52 and a contact member 53, as best seen with reference to FIG. 3 of the drawings. The disconnect switch means 52 is connected in electrical circuit relation with the signal producing electrical circuitry housed within the transmitter 26 which in turn is connected to the terminal means of the latter, i.e., the receptacles 48 which when the transmitter 26 is received in the housing 24 cooperate with the male plugs 36 to connect the circuitry of the transmitter 26 with the electrical power supply of the motor vehicle. The disconnect switch means 52 is operable to disconnect the electrical circuitry of the transmitter 26, from the batteries housed within the latter which provide the transmitter 26 with a self-contained internal power supply, for purposes of connecting the electrical circuitry of the transmitter 26 to an external electrical power supply, i.e., in circuit relation with the electrical system of the motor vehicle through the engagement of the terminal means of the transmitter 26 with the terminal means of the housing 24. The manner in which the actuation of the disconnect switch means 52 is accomplished is best understood with reference to FIGS. 4 and 6 of the drawings. As shown in FIG. 6 of the drawings, the disconnect switch means 52 includes a member operable as a switch which is pivotably mounted in the transmitter 26 about a pivot pin 54 whereby the aforereferenced member is pivotable between a first position depicted in solid lines in FIG. 6 wherein the member projects into the slot 50 and a second position depicted in broken lines in the same figure wherein the member is located within the body of the transmitter 26, i.e., out of the slot 50. In accord with conventional practice, the switch member of the disconnect switch means 52 is preferably resiliently biased so as to normally occupy the aforedescribed first position thereof. As best understood with reference to FIG. 4 of the drawings, as the transmitter 26 is inserted into the housing 24, the switch member of the disconnect switch means 52 is engaged by the inclined surface 42 of the member 46 and rides therealong so as to be automatically pivoted from the first position thereof to the second position thereof whereby by the time the male plugs 36 are received in the receptacles 48, the disconnect switch 52 has operated to disconnect the signal producing electrical circuitry of the transmitter 26 from the internal power supply thereof, i.e., the batteries housed therewithin.

Returning now to the contact member 53, the latter is connected in electrical circuit relation with the signal producing electrical circuitry of the transmitter 26 whereby to receive the output therefrom. The control member 53 in accord with the illustrated embodiment thereof is as depicted in FIG. 3 of the drawings, preferably mounted within the slot 50 so as to be substantially flush with the surface forming the bottom wall of the slot 50. Moreover, the contact member 53 is suitably located intermediate the ends of the slot 50 so as to be engageable with the contact strip 46 supported on the member 44 when the transmitter 26 is fully inserted into the housing 24. Although not shown in the drawings in the interest of maintaining clarity of illustration therein, the contact strip 46 preferably is in the nature of a spring member which is resiliently biased outwardly of the member 44 whereby when the transmitter 26 is fully inserted into the housing 24, the contact strip 46 is inherently biased against the contact member 53 so as to ensure the establishment of good contact therebetween.

To complete the description of the nature of the construction of the transmitter 26, the latter is provided with switch means 56 supported in the front wall thereof. The switch means 56 can take the form of any conventional type of switch, however, in accord with the illustrated embodiment thereof the switch means 56 is preferably of the push type. More specifically, the switch means 56 embodies a construction which is well-known to those skilled in the art wherein the switch portion of the switch means 56 is movable between an undepressed position which corresponds to a first circuit condition and a depressed position which corresponds to a second circuit condition, and wherein the switch portion of the switch means 56 is resiliently biased to its undepressed position which corresponds to the normal position thereof. The switch means 56 is suitably connected in electrical circuit relation in a manner well-known to those skilled in the art to the electrical circuitry housed within the transmitter 26. The switch means 56 is operable as an ON-OFF switch for the transmitter 26 wherein when actuated the switch means 56 causes a signal to be produced and transmitted from the transmitter 26. It is this signal which is received by a cooperating receiver and which operates as a control signal to cause the initiation of the performance of some type of function by mechanism which is cooperatively associated with the aforementioned receiver. As shown in FIGS. 3 and 4 of the drawings, the transmitter 26 is preferably provided with a flange portion 58 which performs a dual function, namely that of a protective housing for the switch member of the switch means 56 and as a stop means operable to limit the extent to which the transmitter 26 is inserted into the housing 24 by virtue of the interengagement of the under surface 58a of the flange portion 58 with the flanges 30a and 32a of the sidewalls 30 and 32, respectively, of the housing 24.

There will now be set forth a description of the manner in which the garage door radio control transmitter assembly constructed in accord with the present invention may be employed. For purposes of this description, one exemplary use which can be made thereof will be utilized by way of illustration. Assume that one wishes to use his motor vehicle which is presently located within the garage, that the latter is provided with means controllable by a signal transmitted from a garage door radio control transmitter to control the opening and closing of the door of the garage, and that the door of the garage is closed. Moreover, assume that the individual has in his possession the transmitter 26 of the garage door radio control transmitter assembly of the present invention. As the individual approaches the garage to enter his motor vehicle, by actuating the switch means 56 of the transmitter 26 he can cause the latter operating from its own power supply, i.e., its own battery, to produce and transmit a signal which will be received by the receiver with which the garage door is equipped. Upon being received, the signal is effective to cause the garage door which had been closed to open. With the garage door now open, the individual can proceed into the garage and enter the motor vehicle. Once in the motor vehicle, the individual inserts the transmitter 26 into the housing 24 formed for this purpose in the dashboard 22. This is in contradistinction to the practice formerly employed with transmitters constructed in accordance with the prior art which were commonly placed either on the top of the dashboard of the motor vehicle or the seat thereof, i.e., in a position wherein the transmitter was susceptible to being accidentally damaged, misplaced or lost. As the transmitter 26 is inserted into the housing 24, the camming means 40 of the latter functions to cause the disconnect switch means 52 to move to its disconnect position. This in turn causes the signal producing circuitry housed within the transmitter 26 to be disconnected from the internal power supply, i.e., the batteries, of the latter and connected in circuit relation, through insertion of the male plugs 36 in the receptacles, i.e., jacks, 48, with the electrical system and more particularly with the power supply of the motor vehicle. The individual can then buckle his seat belts, start the engine of the motor vehicle, and drive the latter from the garage. Once the motor vehicle has been removed from the garage, the individual can then stop the motion of the motor vehicle but with the engine thereof still running and his seat belts still buckled, reach over to the transmitter 26 and actuate the switch means 56 thereof by depressing the switch member of the latter, which is exposed when the transmitter 26 is received in the housing 24. Actuating the switch means 56 in the aforedescribed manner causes another signal to be produced and transmitted from the transmitter 26. This latter signal is received by the aforereferenced receiver and is operable to cause the garage door to close. The driver can then put the motor vehicle in gear and proceed to drive away without either having had to leave the garage door open or to leave the motor vehicle to manually close the garage door. There are two further things which should be noted at this point with reference to the employment of the garage door radio control transmitter assembly of the present invention. First it has been found that the body of the motor vehicle often has a shielding effect upon a signal being transmitted from a transmitter located within the interior of the motor vehicle to a receiver positioned externally of the motor vehicle. Consequently, in accord with the preferred embodiment of the garage door radio control transmitter assembly of the present invention, the transmitter 26 of the latter is provided with the contact member 53 which when the transmitter 26 is fully inserted into the housing 24 makes contact with the contact strip 46 which in turn is connected in circuit relation with the antenna means of the motor vehicle. Accordingly, when the transmitter 26 is actuated to cause a signal to be transmitted therefrom this signal is transmitted through the contact member 53 and the contact strip 46 to the antenna means of the motor vehicle from which the signal is then transmitted to a cooperating receiver. As a result, the shielding effect produced by the body of the motor vehicle is significantly minimized, if not completely obviated. A second desirable feature of the garage door radio control transmitter assembly constructed in accord with the present invention is that the latter need not be operated solely from its own internal power supply. More specifically, with the transmitter 26 housed in the housing 24, the transmitter 26 is powered from the power supply of the motor vehicle. In addition, the power supply of the motor vehicle can be utilized to recharge the batteries of the transmitter 26 when the transmitter 26 is positioned in the housing 24 thereby ensuring that the transmitter 26 is always ready for use.

Although only one embodiment of a garage door radio control transmitter assembly constructed in accordance with the present invention has been shown in the drawings and described hereinabove, it is to be understood that modifications in the construction thereof may be made thereto by those skilled in the art without departing from the essence of the invention. In this connection, some of the modifications which can be made in the subject garage door radio control transmitter assembly have been alluded to hereinabove while others will become readily apparent to those skilled in the art when exposed to the present description and illustration of the construction of the garage door radio control transmitter assembly. For example, although the housing 24 has been described hereinabove and illustrated in the drawings as being provided in the dashboard 22, it is to be understood that the housing 24 could also, without departing from the essence of the invention, be formed in some other portion of the interior of a motor vehicle such as, for example, in the lower vertical surface of the seat wherein the housing 24 and more particularly the transmitter 26 received therein would still remain readily accessible to the driver of the motor vehicle when positioned behind the steering wheel thereof. Also, rather than providing the transmitter 26 with the disconnect switch means 52 and the housing 24 with the camming means 40 as the means operable for disconnecting the electrical circuitry of the transmitter 26 from an internal power supply and connecting it to an external power supply, the receptacles 48 could be replaced by another form of jacks presently being commercially marketed which is capable of automatically performing the aforedescribed disconnect function in response to the receipt therein of the male plugs 36, without departing from the essence of the invention. Obviously, the housing 24 and the transmitter 26 need not be limited to the particular configuration thereof depicted in the drawings. In this regard, it is only necessary that the external configuration of the transmitter 26 conform to the internal configuration of the housing 24 to permit the former to be inserted into the latter. Also, if so desired, the transmitter 26 may be provided with some type of switch means other than the switch means 56 operable for actuating the transmitter 26 to cause a signal to be transmitted therefrom. In addition, there may be some applications wherein the shielding effect of the body of the motor vehicle is not a significant factor and as a result one may, if so desired, without departing from the essence of the invention omit from the garage door radio control transmitter assembly the contact member 53 in the transmitter 26 and the contact strip 46 in the housing 24.

Thus, it can be seen that the present invention provides a novel and improved garage door radio control transmitter assembly which is particularly suited for use as a mounting, i.e., stowing, means for supporting a garage door radio control transmitter assembly within a motor vehicle. Moreover, in accord with the present invention a garage door radio control transmitter assembly has been provided consisting of a garage door radio control transmitter and a housing provided therefor in the dashboard of the vehicle. The garage door radio control transmitter assembly of the present invention embodies a construction wherein the transmitter thereof is operable either when positioned in the housing or when removed therefrom. Furthermore, a garage door radio control transmitter assembly has been provided in accord with the present invention wherein the batteries of the transmitter are rechargeable when the latter is positioned in the housing provided therefor in the daashboard of the vehicle. Also, in accord with the present invention a garage door radio control transmitter assembly has been provided wherein the transmitter thereof is compatible with the receivers which are presently being employed for the purpose of accomplishing radio control operation of garage doors. Finally, the garage door radio control transmitter assembly of the present invention is relatively inexpensive to manufacture, is easy to employ and is capable of providing long and trouble-free operation.

Having thus described the invention, I claim:

1. A garage door radio control transmitter assembly for use with a motor vehicle having an instrument panel comprising:
   a. a garage door radio control transmitter having a first operating condition and a second operating condition, said transmitter embodying electrical cirrcuitry operable when said transmitter is in said first operating condition to produce and transmit a signal receivable by a cooperating receiver located in spaced relation to said transmitter, said transmitter being operable to be powered selectively from an internal electrical power supply and an external electrical power supply;
   b. switch means connected in electrical circuit relation with the electrical circuitry of said transmitter and mounted on said transmitter so as to be externally accessible, said switch means having an actuated position and an unactuated position, said switch means being operable when in said actuated position thereof to effect the establishment of said first operating condition of said transmitter and being operable when in said unactuated position thereof to effect the establishment of said second operating condition of said transmitter;
   c. disconnect means connected in electrical circuit relation with the electrical circuitry of said transmitter and mounted on said transmitter so as to be externally accessible, said disconnect means having an unactuated position and an actuated position, said disconnect means being operable when in said unactuated position thereof to permit said transmitter to derive electrical power from the internal electrical power supply and being operable when in said actuated position thereof to disconnect the electrical circuitry of said transmitter from the internal electrical power supply;
   d. first terminal means connected in electrical circuit relation with the electrical circuitry of said transmitter and mounted on said transmitteer so as to be externally accessible, said first terminal means being operable for establishing an electrical connection between the electrical circuitry of said transmitter and the external electrical power supply;
   e. a housing formed on the instrument panel of the motor vehicle, said housing comprising a multiplicity of wall members interconnected together to form a receptacle having one open wall, said housing having internal dimensions greater than the external dimensions of said transmitter and having an internal configuration conforming to the external configuration of said transmitter to permit said transmitter to be inserted into said housing through said open wall;
   f. second terminal means mounted on one of said multiplicity of wall members of said housing in the path of movement of said first terminal means of said transmitter and connectible to said first terminal means of said transmitter when said transmitter is inserted into said housing to effect an electrical circuit connection between said first and second terminal means;

g. conductor means having one end thereof connected in electrical circuit relation with said second terminal means and the other end thereof connected in electrical circuit relation in the electrical system of the motor vehicle, said conductor means being operable for connecting the electrical circuitry of said transmitter in electrical circuit relation with the external electrical power supply consisting of the electrical system of the motor vehicle through the interconnection of said first and second terminal means when said transmitter is inserted into said housing; and h. actuator means supported on one of said multiplicity of wall members of said housing in the path of movement of said disconnect means on said transmitter for engagement therewith when said transmitter is inserted into the housing, said actuator means being operable to automatically cause said disconnect means through the engagement therewith to occupy said actuated position thereof and thereby automatically effect a disconnection of the electrical circuitry of said transmitter from the internal electrical power supply as said transmitter is being inserted into said housing.

2. The garage door radio control transmitter assembly as set forth in claim 1 wherein said housing includes an open front end wall, a closed rear end wall, a top wall, a bottom wall and a pair of side walls with said pair of side walls being formed integrally with said closed rear end wall and said top and bottom walls.

3. The garage door radio control transmitter assembly as set forth in claim 2 wherein said second terminal means includes a pair of male plugs mounted on said closed rear end wall of said housing so as to project into the interior of said housing.

4. The garage door radio control transmitter assembly as set forth in claim 3 wherein said first terminal means comprises a pair of receptacles formed in one side of said transmitter operable for receiving therewithin said pair of male plugs.

5. The garage door radio control transmitter assembly as set forth in claim 2 wherein said transmitter has a slot formed in a side thereof extending longitudinally therein and having a length less than the length of said side, and said disconnect means being supported on said transmitter in juxtaposed relation to said slot for movement between said unactuated position wherein said disconnect means extends into said slot and said actuated position wherein said disconnect means is removed from said slot.

6. The garage door radio control transmitter assembly as set forth in claim 5 wherein said actuator means comprises camming means mounted on one of said pair of side walls of said housing so as to project into the interior thereof.

7. The garage door radio control transmitter assembly as set forth in claim 5 wherein said transmitter further includes a contact member supported in said slot in spaced relation to said disconnect means operatively connected to the electrical circuitry housed within said transmitter for receiving the output therefrom.

8. The garage door radio control transmitter assembly as set forth in claim 7 wherein said housing further includes antenna contact means operatively connected to the antenna of the motor vehicle supported on one of said pair of side walls of said housing for engagement with said contact member when said transmitter is received in said housing.

9. The garage door radio control transmitter assembly as set forth in claim 2 wherein each of said pair of side walls of said housing terminates at the end thereof adjoining said open front end wall in an outwardly extending flange.

10. The garage door radio control transmitter assembly as set forth in claim 9 wherein said switch means is mounted on the front face of said transmitter, the flange means are provided on said front face of said transmitter operable to provide protection for said switch means, said flange means cooperating with said longitudinally extending flanges of said housing to provide a stop means, said stop means operating through the engagement of said flange means with said longitudinally extending flanges of said housing when said transmitter is inserted into said housing to limit the extent to which said transmitter projects into said housing.

* * * * *